United States Patent
Ellson et al.

(10) Patent No.: US 7,266,893 B1
(45) Date of Patent: *Sep. 11, 2007

(54) FILAMENT TRIMMER WITH DUAL TRIGGERS

(75) Inventors: Bart T. Ellson, Excelsior, MN (US);
John O. Hurst, Lakeville, MN (US);
Chadwick A. Shaffer, Oakdale, MN (US)

(73) Assignee: The Toro Company, Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/298,400

(22) Filed: Dec. 9, 2005

Related U.S. Application Data (63) Continuation of application No. 10/116,738, filed on Apr. 4, 2002, now Pat. No. 6,973,728.

(51) Int. Cl.
*A01D 34/84* (2006.01)
(52) U.S. Cl. .............................. 30/276; 56/12.7; 172/14
(58) Field of Classification Search ................... 30/276, 30/347; 56/12.7; 172/13, 14, 15
See application file for complete search history.

(56) References Cited

U.S. PATENT DOCUMENTS

| 4,377,044 | A | 3/1983 | Krug |
| 6,327,781 | B1 * | 12/2001 | Sinclair et al. ................ 30/276 |
| 6,769,494 | B2 * | 8/2004 | Breneman et al. ............ 172/14 |
| 6,973,728 | B2 * | 12/2005 | Ellson et al. .................. 30/276 |

OTHER PUBLICATIONS

Operator's Manual, 7 Inch Cordless Trimmer, pp. 1, 5, and 6, 1992.

* cited by examiner

*Primary Examiner*—Hwei-Siu Payer
(74) *Attorney, Agent, or Firm*—James W. Miller (57) ABSTRACT

A filament trimmer includes a rotatable trimmer head having an outwardly extending filament. The trimmer has an upper handle that the operator can grip to operate the trimmer in either a trim mode or an edge mode. In the trim mode, the filament extending outwardly from the trimmer head is positioned in a generally horizontal cutting plane, while in the edge mode the trimmer is reoriented such that the filament is positioned in a generally vertical cutting plane. The upper handle of the trimmer includes dual triggers for selectively starting and stopping rotation of the trimmer head. One trigger is actuated when the trimmer is operated in the trim mode and the other trigger is actuated when the trimmer is operated in the edge mode.

2 Claims, 9 Drawing Sheets

FILAMENT TRIMMER WITH DUAL TRIGGERS

CROSS REFERENCE TO RELATED APPLICATIONS

This application is a continuation of Ser. No. 10/116,738, filed Apr. 4, 2002, now U.S. Pat. No. 6,973,728.

TECHNICAL FIELD

This invention relates to a filament trimmer having an outwardly extending filament that cuts grass or other ground growing vegetation when the filament is rotated in a cutting plane. More particularly, this invention relates to a filament trimmer that is operable in both a trim mode in which the filament rotates in a generally horizontal cutting plane and in an edge mode in which the filament rotates in a generally vertical cutting plane.

BACKGROUND OF THE INVENTION

Filament trimmers are well known lawn and garden implements. Such a trimmer includes a rotatable trimmer head that has an outwardly extending flexible filament. When the trimmer head is rotated by a drive contained on the trimmer, the filament is spun in a cutting plane to be able to sever grass or other ground growing vegetation. The drive for rotating the trimmer head may be an electrical motor operated by an electrical power source, e.g. a battery on the trimmer or an electric power cord. The drive may also be a drive shaft operated by an internal combustion engine carried on the trimmer.

Some filament trimmers are specifically designed for use in both a trim mode and an edge mode. In the trim mode, the trimmer head is placed generally parallel to the ground such that the filament is rotated in a generally horizontal cutting plane to trim grass or weeds at a height above the ground depending on how close the trimmer head is positioned adjacent the ground. In the edge mode, the trimmer is reoriented from its orientation in the trim mode. In the edge mode, the trimmer head is generally perpendicular to the ground such that the filament is rotated in a generally vertical cutting plane to edge grass along a sidewalk or the like, i.e. to cut off the grass at ground level along the edge of the sidewalk.

In prior trimmers designed with both trim and edge modes, the upper handle of the trimmer contains a single trigger for starting and stopping rotation of the trimmer head. In addition, the upper handle of the trimmer pivots to selectively reposition the upper handle when using the trimmer in both the trim and edge modes. This repositioning is done by providing the upper handle with two different operating positions and by pivoting the handle from one operating position to the other operating position to use the trimmer in one mode of operation or the other. However, some operators do not intuitively understand how to pivot the handle and thus find it difficult to initially figure out how to reposition the upper handle to use the trimmer in both the trim and edge modes of operation. In addition, the need to stop the trimmer and manually reposition the upper handle is inconvenient and thus discourages some operators from switching between the two available modes of operation.

SUMMARY OF THE INVENTION

This invention relates to a filament trimmer having dual triggers on the handle with one trigger being used in the trim mode and one trigger in the edge mode. This allows use of the trimmer in both modes without requiring a handle that must be repositioned relative to the rest of the trimmer to operate in both modes.

One aspect of this invention relates to a filament trimmer that comprises a rotatable trimmer head having an outwardly extending filament. An upper handle is provided which the operator can grip to position the trimmer head adjacent the ground and to operate the trimmer in either a trim mode or an edge mode. The filament is positioned in a generally horizontal cutting plane in the trim mode and in a generally vertical cutting plane in the edge mode. Dual triggers are provided on the upper handle for selectively starting and stopping rotation of the trimmer head. One trigger is actuated to operate the trimmer in the trim mode and the other trigger is actuated to operate the trimmer in the edge mode.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

A first embodiment of a filament trimmer 2 according to this invention is illustrated in FIGS. 1-4.

Figure 1:
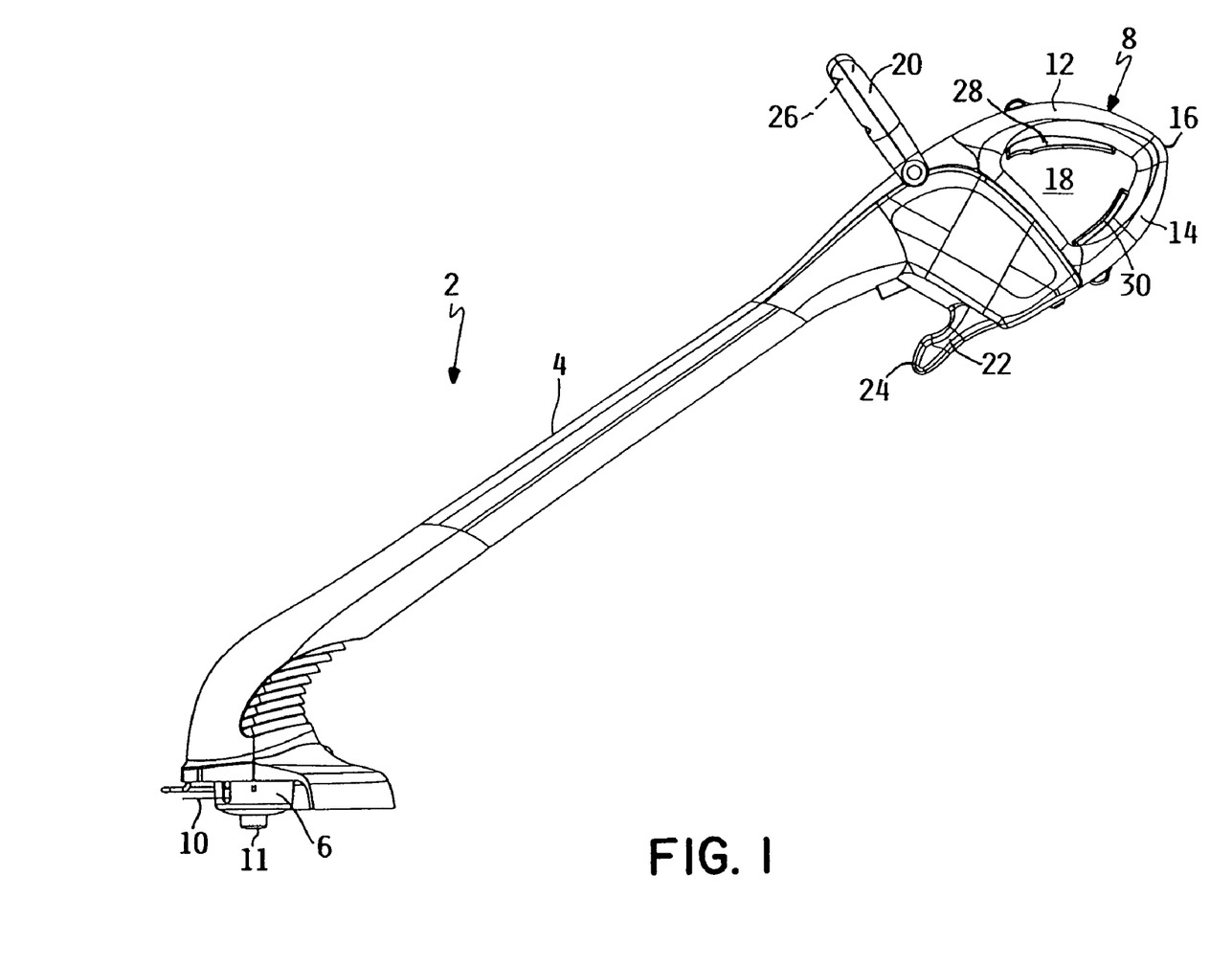
FIG. 1 is a side elevational view of a first embodiment of a filament trimmer according to this invention, particularly illustrating the trimmer positioned in the trim mode.
Figure 2:
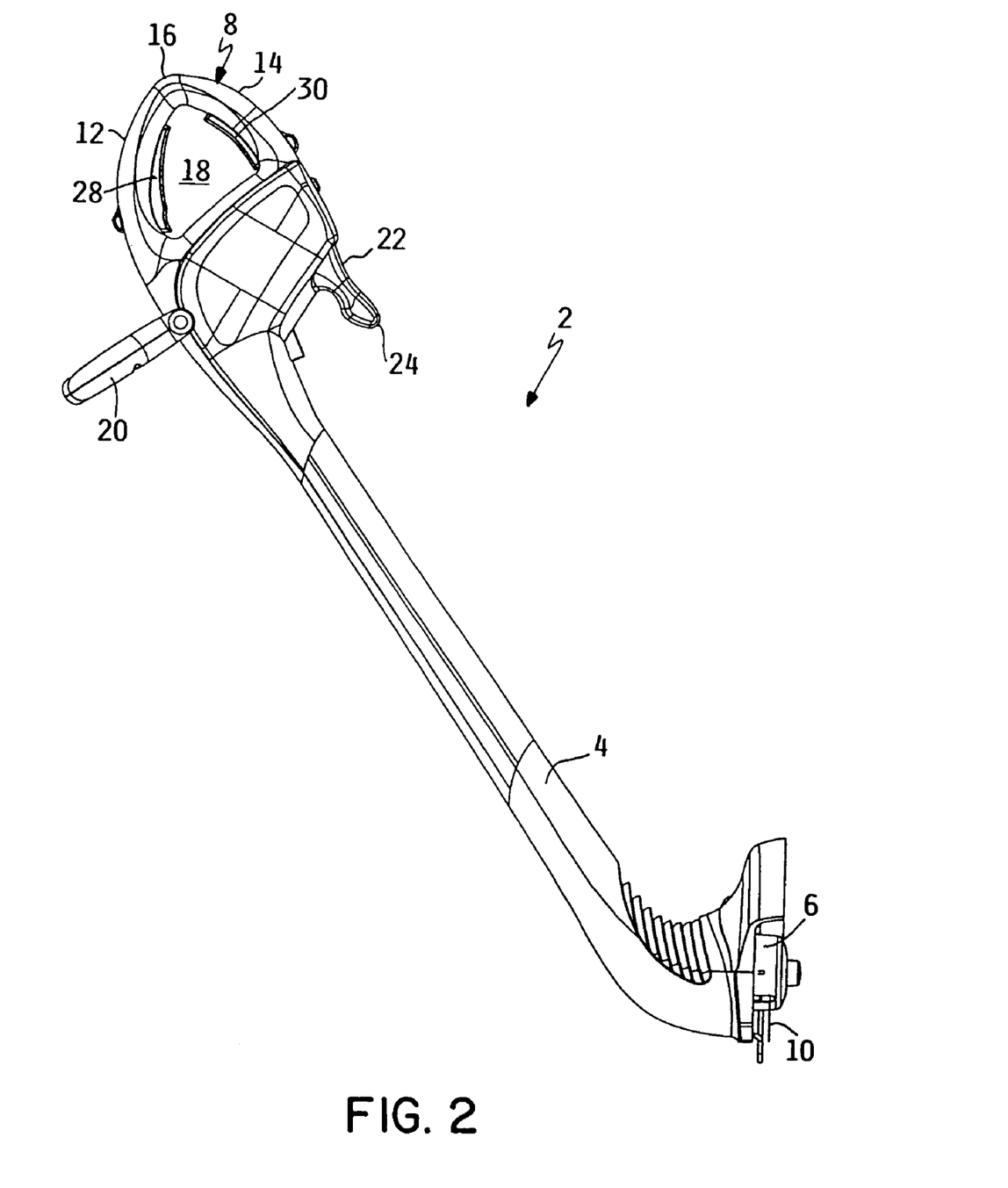
FIG. 2 is a side elevational view of the filament trimmer shown in FIG. 1, particularly illustrating the trimmer positioned in the edge mode.

Trimmer 2 includes a housing 4 carrying a rotatable trimmer head 6 at the lower end of housing 4. Housing 4 includes a handle 8 at the upper end of housing 4 to allow the operator to grip and hold trimmer 2. A drive comprising an electric drive motor (not shown) is provided in housing 4 for rotating trimmer head 6. A rechargeable battery (not shown) is located in housing 4 and is electrically coupled to the motor for powering the motor. When the motor is powered and trimmer head 6 is rotated, a flexible filament 10 extending outwardly from trimmer head 6 is spun in a cutting plane to sever grass or other ground growing vegetation.

Trimmer head 6 preferably includes a filament feed system that replenishes the flexible filament when filament 10 is shortened due to use. Trimmer head 6 comprises a ground bump head having a ground bump button 11. This allows the operator to selectively actuate the filament feed system by bumping ground bump button 11 against the ground to feed out new filament in a filament replenishment operation. The structural and operational details of ground bump heads are well known in the filament trimmer art and need not be further described herein. U.S. Pat. No. 6,279,235, assigned to the assignee of this invention, discloses one such ground bump head and is hereby incorporated by reference.

Alternatively, trimmer head 6 could use a filament feed system that operates automatically without conscious operator action, such as an automatic feed trimmer head that is responsive to centrifugal force and how centrifugal force changes as the filament shortens to automatically feed out additional filament when the filament shortens more than is desired. Additionally, trimmer head 6 could comprise a manual feed trimmer head in which the trimmer is stopped, the filament feed system in the trimmer head is unlocked, and the operator then manually pulls out additional filament from the trimmer head. Finally, trimmer head 6 could even be provided with no filament feed system at all, such as a trimmer head using at least one piece of a fixed length filament that when shortened is simply replaced with a new piece of fixed length filament. Thus, the nature of the filament feed system, and even the presence of a filament feed system, is not important to this invention.

Handle 8 comprises a first front hand grip 12 and a second rear hand grip 14 joined together at an apex 16. Apex 16 could be deleted if so desired such that a small gap would be provided between front and rear hand grips 12 and 14 where apex 16 had been located. Front and rear hand grips 12 and 14 are preferably angled relative to one another. Each front and rear hand grip 12 and 14 is gently curved, but could also be more or less straight if so desired. Handle 8 includes an enclosed hand grip space 18 lying beneath front and rear hand grips 12 and 14.

Housing 4 of trimmer 2 also includes a pair of cantilevered, assist handles attached thereto, namely a front assist handle 20 and a rear assist handle 22. Front assist handle 20 is a loop type handle bolted to housing 4 with the loop type handle having an upper transverse cross member 26 that the operator can grip. Rear assist handle 22 is molded to housing 4 and is wide enough so that the operator can rest the palm of one hand on rear assist handle 22 and grip the lower end 24 of rear assist handle 22 by curling the fingers of that hand around the free lower end 24 of rear assist handle 22.

Dual triggers are provided on handle 8 to allow the operator to selectively actuate trimmer head 6. A front trigger 28 is located on front hand grip 12 of handle 8. A rear trigger 30 is located on rear hand grip 14 of handle 8. Triggers 28 and 30 actuate an electrical switch 32 that controls the application of electrical power to the motor that rotates trimmer head 6.

Each trigger 28 and 30 includes a relatively long lower portion 34 that sticks out through the underside of the corresponding hand grip 12 or 14 and a relatively short upper portion 36 that sticks out through the top of the corresponding hand grip 12 or 14. The operator can actuate each trigger by squeezing lower portion 34 of the trigger closed against the underside of the hand grip using the operator's fingers, as depicted by the arrows A in FIG. 3.

Figure 3:
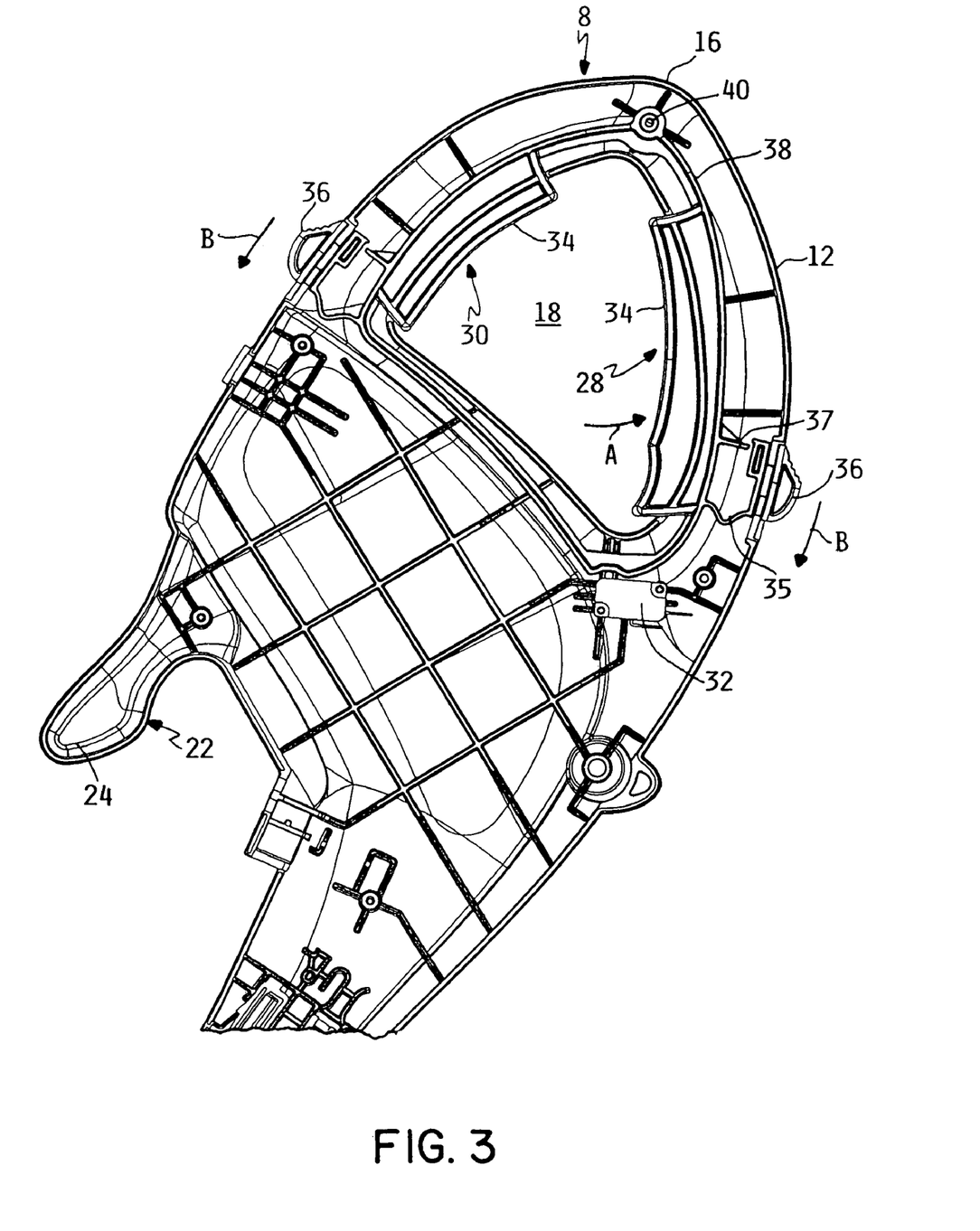
FIG. 3 is an enlarged side elevational view of the upper handle of the filament trimmer shown in FIG. 1, with a portion of the upper handle removed to illustrate the dual triggers and their interaction with an electrical push button switch for actuating the trimmer head but with both of the triggers being shown in a non-actuated state with the switch in its off state.

However, lower portion 34 of the trigger can be squeezed closed only if the operator first pushes down on upper portion 36 of the trigger with the operator's thumb in a slide type action, as depicted by the arrows B in FIG. 3, to flex a flexible portion 35 of the trigger. The flexing action of flexible portion 35 is sufficient to move the underside of upper portion 36 of the trigger out of the way of a rib 37 on lower portion 34, thereby allowing lower portion 34 to be squeezed up against the underside of the corresponding hand grip. If the operator does not first push down on upper portion 36 with his thumb as illustrated by the arrows B in FIG. 3, rib 37 on lower portion 34 will engage against the underside of upper portion 36 to stop movement of lower portion 34 short of the point at which switch 32 is actuated. Thus, upper portion 36 of each trigger 28 and 30 requires a two step process to obtain actuation of trimmer head 6, i.e. upper portion 36 must first be slid down and then lower portion 34 must be squeezed closed.

Figure 4:
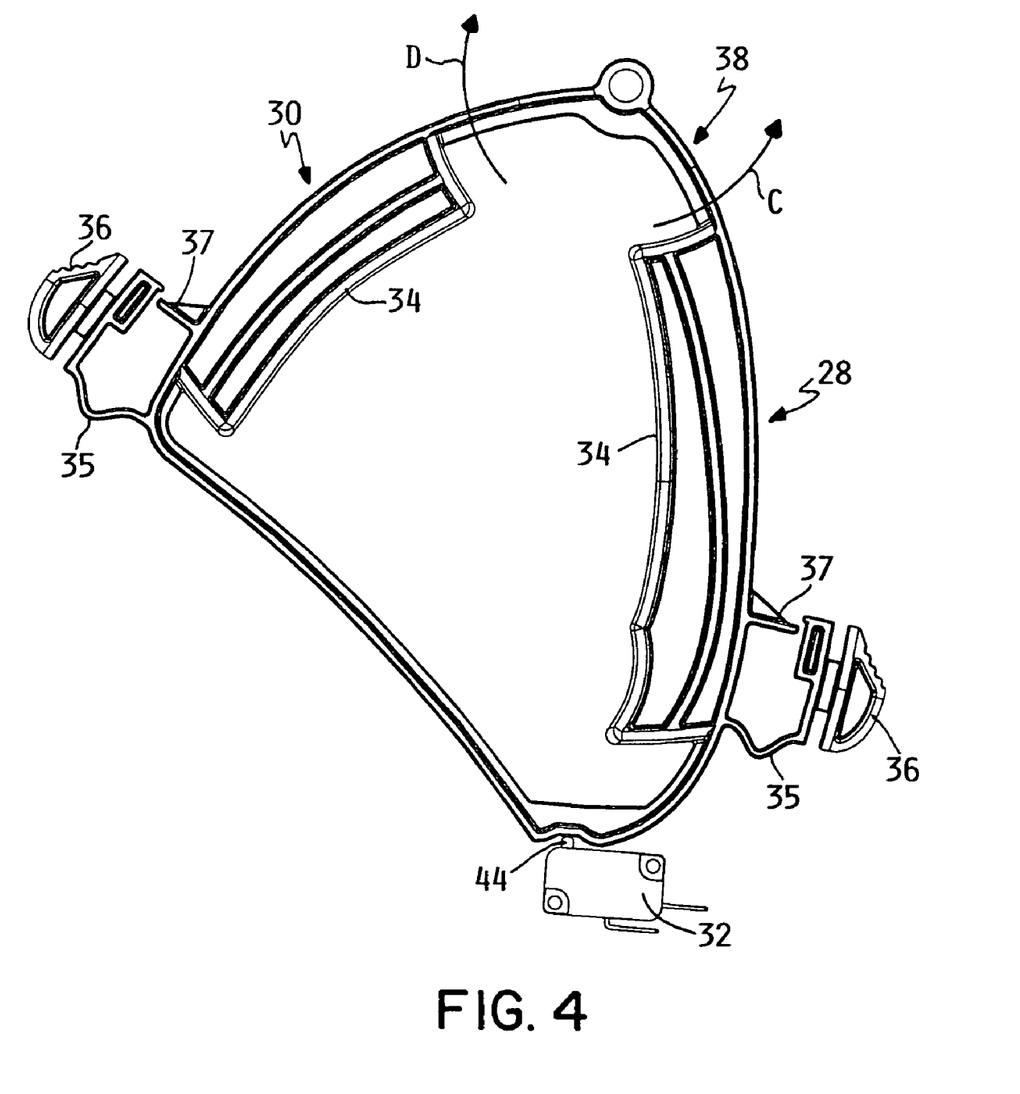
FIG. 4 is an enlarged side elevational view similar to FIG. 3, but showing only the dual triggers and the switch disposed in the same states as depicted in FIG. 3.

Referring more particularly to FIGS. 3 and 4, front and rear triggers 28 and 30 are actually part of a single, integrated rocker type trigger assembly 38 such that front and rear triggers 28 and 30 move conjointly with one another. As shown in FIG. 3, trigger assembly 38 pivots about a pivot pin 40 located at apex 16 of handle 8. Trigger assembly 38 pivots in opposite directions about pivot pin 40, as depicted by the arrows C and D in FIG. 4, depending upon whether front trigger 28 or rear trigger 30, respectively, is actuated. Trigger assembly 38 includes a notch 42 in which an actuating button 44 of a push button electrical switch 32 is received. Movement of trigger assembly 38 in either direction about pivot pin 40 causes notch 42 to push in on actuating button 44 of switch 32 to change the state of switch 32 from an off state to an on state and cause trimmer head 6 to start rotating.

Actuating button 44 of electrical switch 32 is normally biased by a spring inside switch 32 to move outwardly to place switch 32 into the off state of switch 32. Notch 42 on trigger assembly 38 pushes in on actuating button 44 only by overcoming the spring force normally biasing actuating button 44 outwardly. Thus, when the operator releases whatever trigger was used to actuate trimmer head 6, the spring force on actuating button 44 will act to push actuating button 44 back out, thus acting on notch 42 on trigger assembly 38 to move trigger assembly 38 back to a neutral condition in which electrical switch 32 is normally disposed in its off state. Thus, when neither trigger 28 or 30 has been actuated, electrical switch 32 is in the off state such that no electrical power is supplied to the motor and trimmer head 6 is not rotating.

The orientation of trimmer 2 in a trim mode is shown in FIG. 1. In the trim mode, the operator stands behind housing 4 and grips front hand grip 12 of handle 8 with one hand with the palm of the operator's hand resting on top of front hand grip 12 and with the fingers of the operator's hand curling around front hand grip 12 with the fingers being received in hand grip space 18 gripping against the underside of front hand grip 12. The operator can then grip cross member 26 of front assist handle 20 with the operator's other hand. When holding trimmer 2 thusly, namely with one hand placed on front hand grip 12 and the other hand placed on front assist handle 20, the operator is able to position trimmer 2 in the customary trim mode shown in FIG. 1, where filament 10 extending from trimmer head 6 spins in a generally horizontal plane to trim or sever grass or other ground growing vegetation. To actuate trimmer head 6 in the trim mode, the operator need only actuate front trigger 28 by squeezing lower portion 34 of the trigger closed against the underside of front hand grip 12 after first pushing or sliding upper portion 36 of the trigger downwardly along the top of front hand grip 12.

The orientation of trimmer 2 in an edge mode is shown in FIG. 2. The edge mode is one used for edging grass or other vegetation along the edge of a sidewalk or the like. To use trimmer 2 in the edge mode, trimmer 2 is flipped over and reoriented as is clear by comparing FIGS. 1 and 2. In the edge mode, filament 10 extending from trimmer head 6 spins in a generally vertical plane like the cutting blade of a conventional lawn edger.

In the edge mode, the operator now stands in front of housing 4 and grips rear hand grip 14 of handle 8 with one hand with the palm of the operator's hand resting on top of rear hand grip 14 and with the fingers of the operator's hand curling around rear hand grip 14 with the fingers being received in hand grip space 18 gripping against the underside of rear hand grip 14. The operator can then grip lower end 24 of rear assist handle 22 with the operator's other hand. When holding trimmer 2 thusly, namely with one hand placed on rear hand grip 14 and the other hand placed on rear assist handle 22, the operator is able to conveniently position and hold trimmer 2 in the customary edge mode shown in FIG. 2. To actuate trimmer head 6 in the edge mode, the operator need only actuate rear trigger 30 by squeezing lower portion 34 of the trigger closed against the underside of rear hand grip 14 after first pushing or sliding upper portion 36 of the trigger downwardly along the top of rear hand grip 14.

Trimmer 2 of this invention can be used in either the trim or edge modes simply by flipping trimmer 2 over and reorienting it. This is intuitive to do, particularly since the presence of the dual triggers 28 and 30 helps guide the operator in how to place the operator's hands and in how trimmer 2 should be reoriented for the different trim and edge modes. Handle 8 does not have to be pivoted into different operational positions relative to the rest of trimmer 2 as in some prior art trimmers. The dual triggers 28 and 30 allow trimmer head 6 to be comfortably actuated by the operator in either mode of trimmer 2 using the appropriate trigger.

A second embodiment of a filament trimmer 2' according to this invention is illustrated in FIGS. 5-12. Since the second embodiment of trimmer 2' has many common features to that of the first embodiment, the same reference numerals applied to components of trimmer 2 of the first embodiment will be used to refer to the corresponding components of trimmer 2' of the second embodiment except that such identical reference numerals used in conjunction with trimmer 2' of the second embodiment will carry a prime suffix, e.g. trimmer 2' instead of trimmer 2. Only the major points of difference between trimmers 2 and 2' will be specifically described hereafter, the structure and operation of the two trimmers 2 and 2' otherwise being identical for which a separate description would be redundant and unnecessary.

Figure 5:
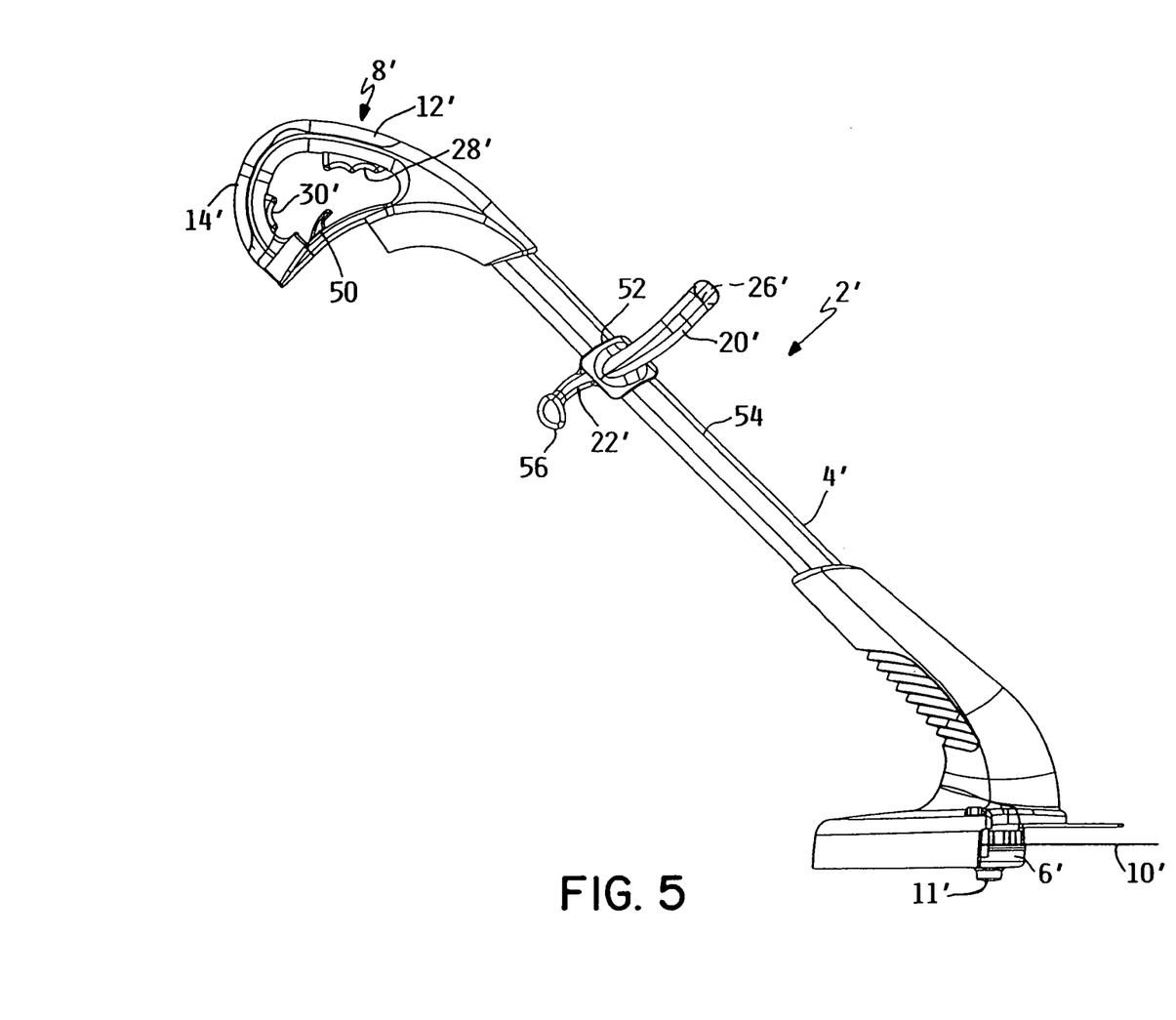
FIG. 5 is a side elevational view of a second embodiment of a filament trimmer according to this invention, particularly illustrating the trimmer positioned in the trim mode.
Figure 6:
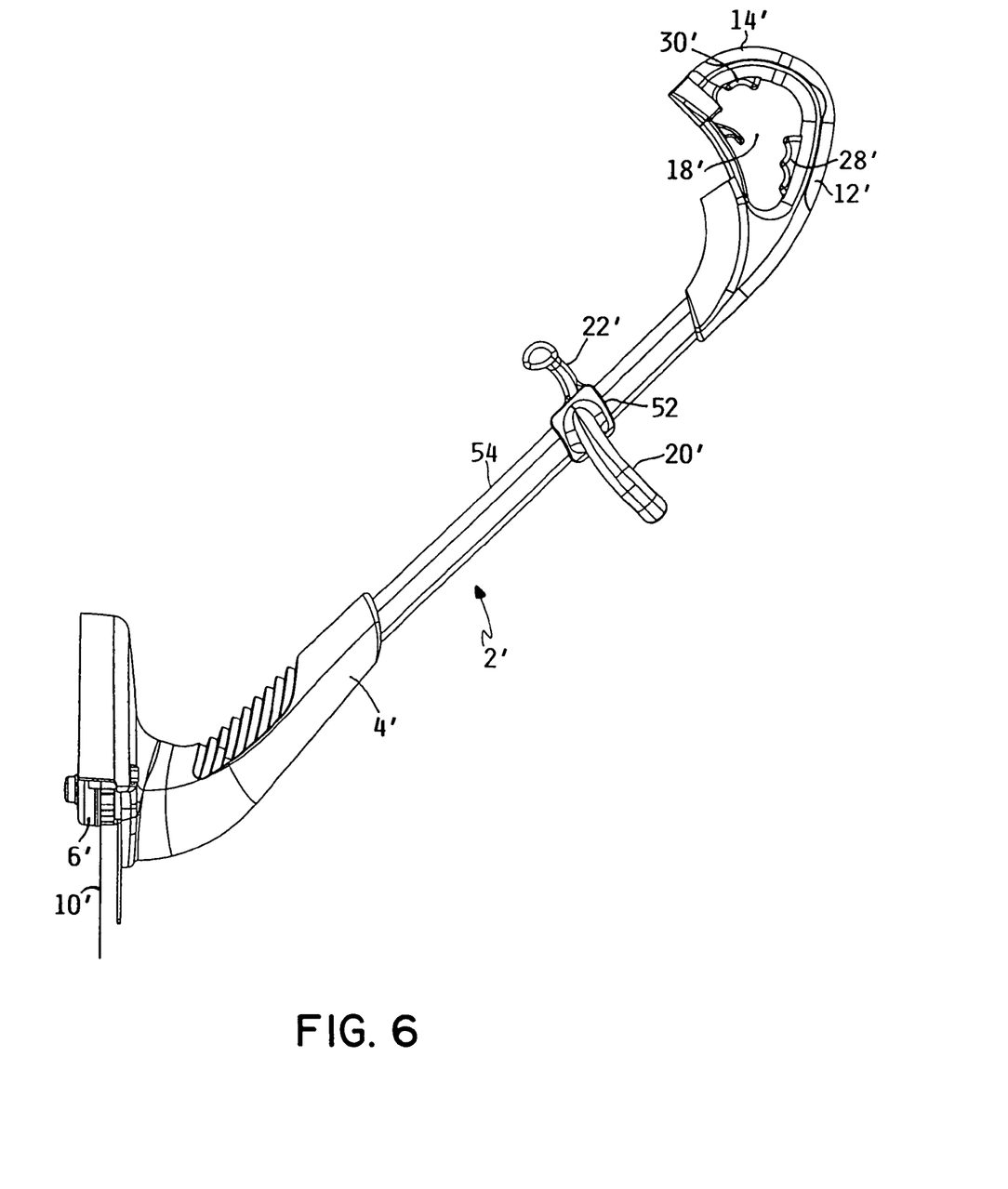
FIG. 6 is a side elevational view of the filament trimmer shown in FIG. 5, particularly illustrating the trimmer positioned in the edge mode.

Trimmer 2' of the second embodiment is not battery operated, but instead carries an electrical socket (not shown) into which one end of an electrical extension cord (not shown) could be plugged. An enclosed hand grip space 18' includes a cord lock 50 for such extension cord. Cord lock 50 is preferably of the type disclosed in U.S. Pat. No. 5,644,844 to Pink, assigned to the assignee of this invention, which patent is incorporated by reference.

Front and rear assist handles 20' and 22' in trimmer 2' are now carried on a common hub 52 that is coupled to on an intermediate connecting tube 54 of housing 4' of trimmer 2'. Front and rear assist handles 20' and 22' both include transverse cross members 26' and 56, respectively, that can be gripped by the operator. Front assist handle 20' may be a loop type handle in which cross member 26' is located at the top of the loop. Rear assist handle 22' may be an L-shaped handle in which cross member 56 is a transversely extending, horizontal leg of the L-shape.

Figure 7:
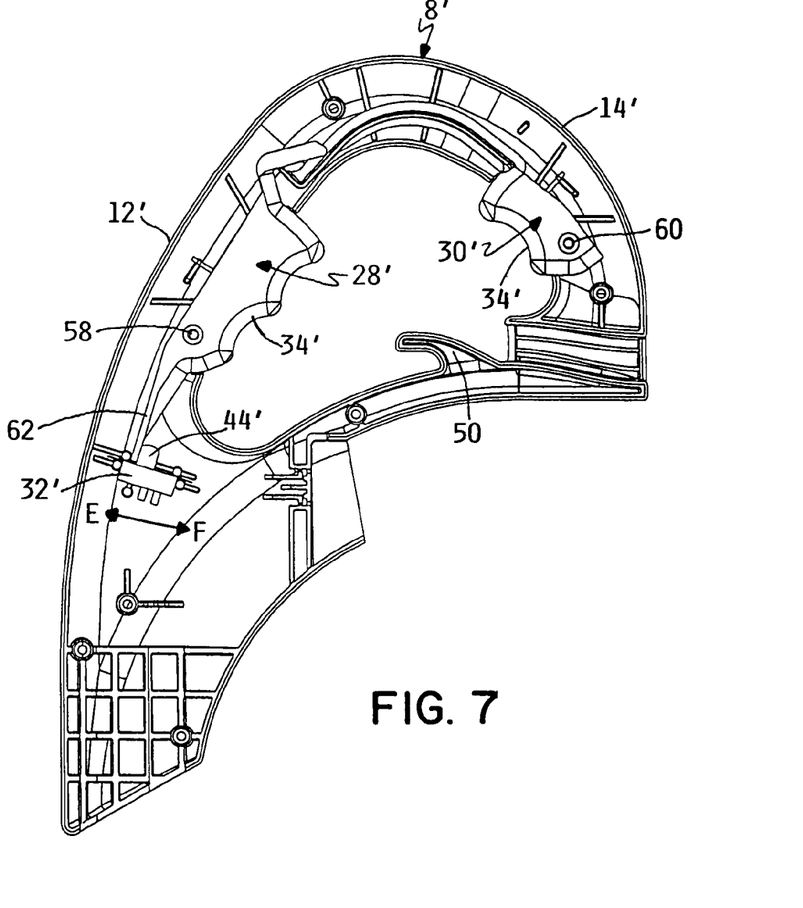
FIG. 7 is an enlarged side elevational view of the upper handle of the filament trimmer shown in FIG. 5, with a portion of the upper handle removed to illustrate the dual triggers and their interaction with an electrical slide switch for actuating the trimmer head but with both of the triggers being shown in a non-actuated state with the switch in its off state.
Figure 8:
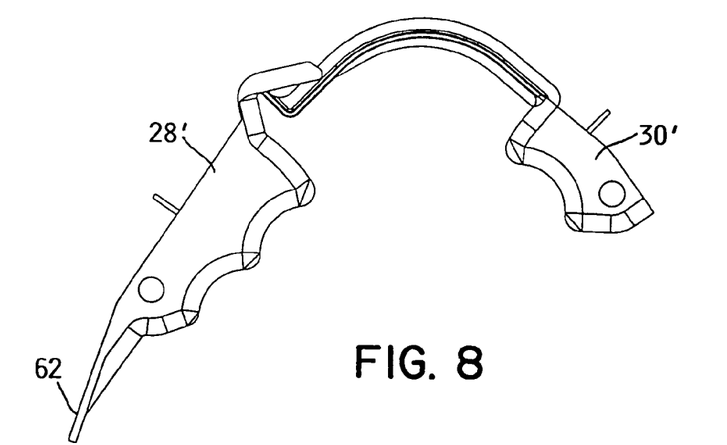
FIG. 8 is an enlarged side elevational view similar to FIG. 7, but showing only the dual triggers and the switch disposed in the same states as depicted in FIG. 7.

Trimmer 2' includes front and rear triggers 28' and 30' that are no longer part of a common integrated trigger assembly 38. Front and rear triggers 28' and 30' are now pivotally mounted to handle 8' on separate pivot pins. Front trigger 28' is pivotally mounted to front hand grip 12' by a front pivot pin 58, and rear trigger 30' is pivotally mounted to rear hand grip 14' by a rear pivot pin 60. Front and rear triggers 28' and 30' each have a lower portion 34' that sticks out through the underside of the corresponding hand grip, but front and rear triggers 28' and 30' no longer have an upper portion that sticks out through the top of the corresponding hand grip.

A single electrical switch 32' is provided within housing 4' for operating the electrical motor that powers trimmer head 6'. Switch 32' is now a slide switch having an actuating button 44' that slides back and forth in opposed directions as shown by the arrows E and F in FIG. 7. Actuating button 44' is normally spring biased in the direction of arrow E by a spring (not shown) inside the housing of switch 32'. The lower end of front trigger 28' is provided with an actuating finger 62 that engages the side of actuating button 44' that is opposite to the direction of the spring biasing force so that actuating finger 62 can push on actuating button 44' and cause actuating button 44' to slide against the spring biasing force. Thus, when the spring biasing force moves actuating button 44' in the direction of arrow E, actuating finger 62 of front trigger 28' is arranged to push on actuating button 44' in the opposite direction represented by arrow F.

Figure 9:
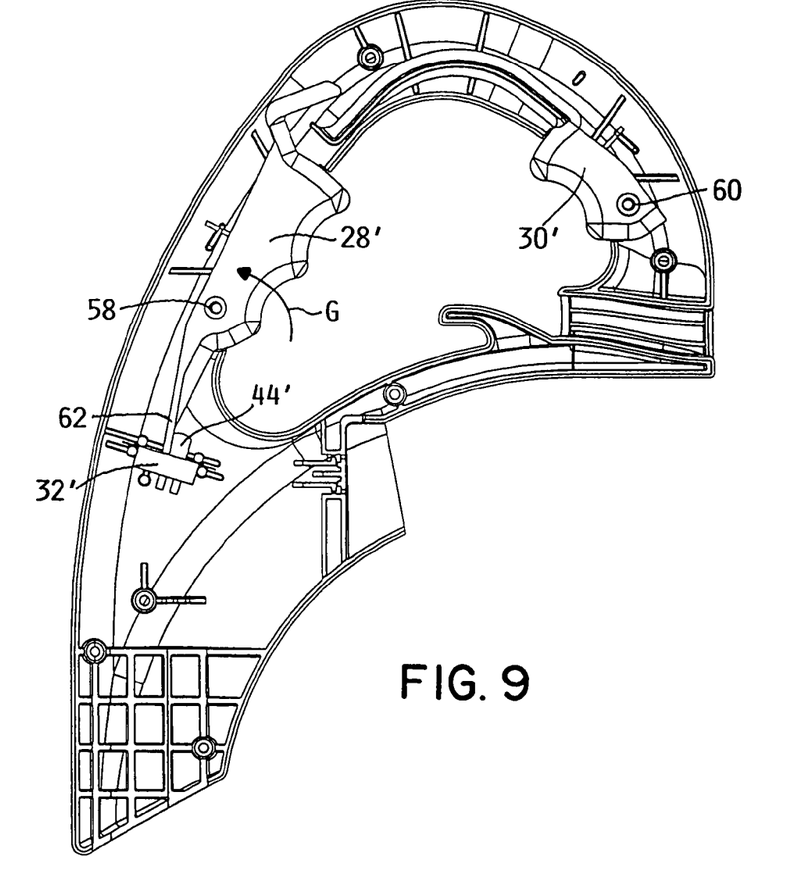
FIG. 9 is an enlarged side elevational view of the upper handle of the filament trimmer shown in FIG. 5, with a portion of the upper handle removed to illustrate the dual triggers and their interaction with an electrical slide switch for actuating the trimmer head but with the front trigger being shown in an actuated state with the switch in its on state to rotate the trimmer head in the trim mode of FIG. 5.
Figure 10:
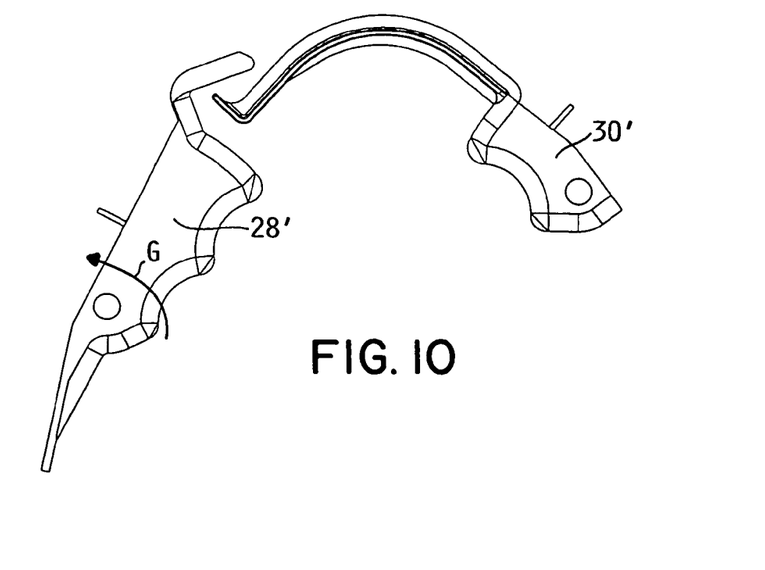
FIG. 10 is an enlarged side elevational view similar to FIG. 9, but showing only the dual triggers and the switch disposed in the same states as depicted in FIG. 9.

When the operator actuates front trigger 28' by gripping front hand grip 12' and by squeezing front trigger 28' closed against the underside of front hand grip 12', as shown in FIG. 9, front trigger 28' is rotated about front pivot pin 58 in the direction of arrow G in FIGS. 9 and 10. This rotary motion of front trigger 28' causes actuating finger 62 to push against actuating button 44' and slide actuating button 44' in the direction of arrow F, against the spring biasing force tending to push actuating button 44' in the direction of arrow E, to actuate switch 32' by changing the state of switch 32' from the off state to the on state. In turn, this applies electrical power to the motor to begin operation of trimmer head 6'. Front trigger 28' will be actuated in this manner, while the operator grabs front hand grip 12' and front assist handle 20', to operate trimmer 2' in the trim mode thereof.

When the operator wishes to stop the operation of trimmer 2' in the trim mode, front trigger 28' is simply released. The spring force tending to slide actuating button 44' in the direction of the arrow E then pushes against actuating finger 62 of front trigger 28' until the trigger moves back to its neutral position, shown in FIGS. 7 and 8. In this neutral position of the trigger, electrical switch 32' is in the off state and trimmer head 6' is not rotating.

To actuate trimmer 2' in the edge mode, the operator first flips trimmer 2' over and reorients it as shown in FIG. 5. The operator then grips rear hand grip 14' and rear assist handle 22' and squeezes rear trigger 30' closed against the underside of rear hand grip 14'. This causes rear trigger 30' to rotate oppositely to front trigger 28', as shown by the arrows H in FIGS. 11 and 12. Moreover, rear trigger 30 is not located proximately to electrical switch 32' and is not in direct engagement with electrical switch 32'.

Figure 11:
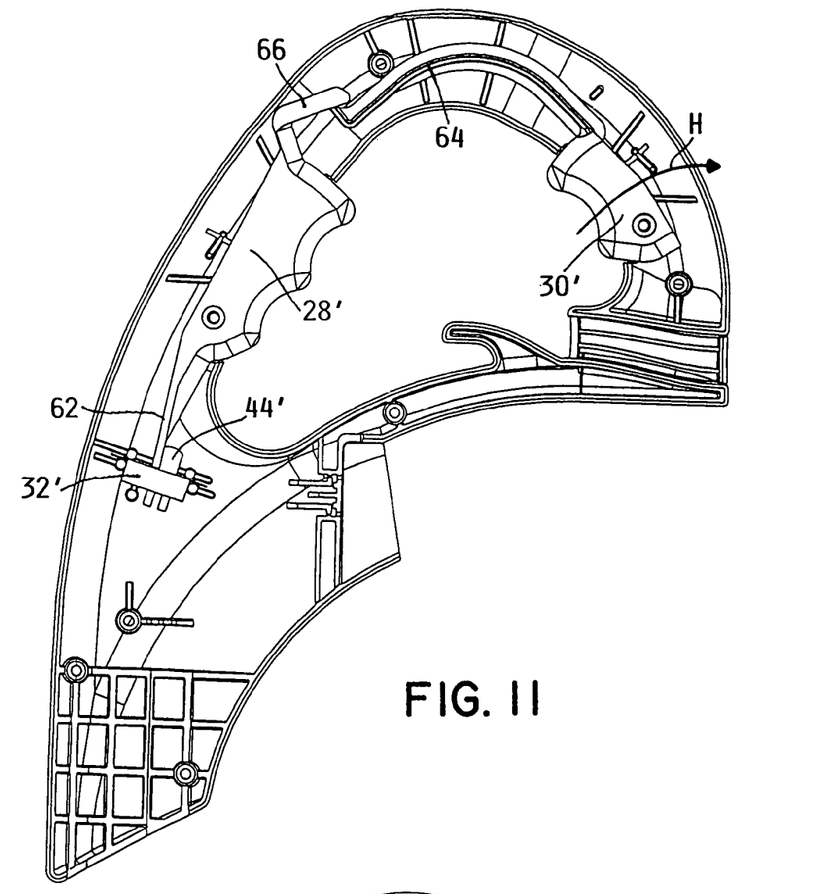
FIG. 11 is an enlarged side elevational view of the upper handle of the filament trimmer shown in FIG. 5, with a portion of the upper handle removed to illustrate the dual triggers and their interaction with an electrical slide switch for actuating the trimmer head but with the rear trigger being shown in an actuated state with the switch in its on state to rotate the trimmer head in the edge mode of FIG. 6.
Figure 12:
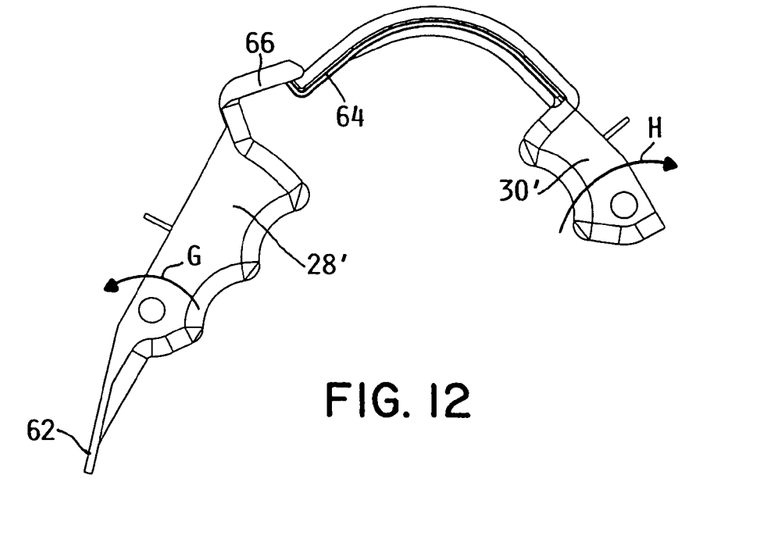
FIG. 12 is an enlarged side elevational view similar to FIG. 11, but showing only the dual triggers and the switch disposed in the same states as depicted in FIG. 11.

However, rear trigger 30' includes a curved, elongated cam finger 64 extending inside housing 4'. Cam finger 64 engages against the underside of a rear surface 66 on front trigger 28'. Thus, rotation of rear trigger 30' in the direction of arrow H causes cam finger 64 to lift up on rear surface 66 of front trigger 28' to rotate front trigger 28 in the usual switch actuating direction G of front trigger 28'. Thus, electrical switch 32' is actuated by rear trigger 30' to operate trimmer 2' in the edge mode, with front trigger 28' serving in this instance as a bridge or connection between rear trigger 30' and actuating button 44' of electrical switch 32'. This allows the use of a single conveniently located electrical switch 32', which can be operated by both triggers 28' and 30' even though such triggers rotate about separate pivot pins 58 and 60 and even though one trigger 30' is located remotely from switch 32'.

Both trimmers 2, 2' disclosed herein use dual triggers 28 and 30, 28' and 30' to actuate a single electrical switch 32, 32'. Using a single electrical switch avoids the expense of more than one switch. However, dual electrical switches could also obviously be used to control the application of electrical power to the motor that rotates trimmer head 6, 6', one switch being proximately located to front trigger 28, 28' and another switch being proximately located to rear trigger 30, 30'.

Moreover, while an electrical motor controlled by an electrical switch has been described as comprising the drive for rotating trimmer head 6, 6', a mechanical drive could be used in place of the electrical drive. Thus, trimmer 2, 2' could be equipped with an internal combustion engine powering a drive shaft operatively connected to trimmer head 6, 6'. The drive shaft could be selectively powered through a mechanical switch, such as a clutch or other selectively actuable, mechanical power coupler. In such a case, the dual triggers when actuated would be linked to the clutch to actuate the clutch to selectively place trimmer head 6, 6' in operation.

Various other modifications will be apparent to those skilled in the art. Thus, this invention shall be limited only by the appended claims.

We claim:
1. A filament trimmer, which comprises:
  a) a rotatable trimmer head having an outwardly extending filament;
  b) an upper handle which an operator can grip to position the trimmer head adjacent the ground and to operate the trimmer in either a trim mode or an edge mode, wherein the filament is positioned in a generally horizontal cutting plane in the trim mode and in a generally vertical cutting plane in the edge mode;
  c) wherein the upper handle has a front curved hand grip and a rear curved hand grip joined to one another at an apex, wherein the front and rear hand grips curve away from the apex to terminate in ends that are spaced apart from one another such that the front and rear hand grips define an arch shaped outer periphery for the upper handle, wherein the operator grips the front hand grip when the trimmer is used in the trim mode and the rear hand grip when the trimmer is flipped over and is used in the edge mode;
  d) a battery housing, wherein the end of the front hand grip is joined to the battery housing adjacent a front side of the battery housing and the end of the rear hand grip is joined to the battery housing adjacent a rear side of the battery housing such that the upper handle is located atop the battery housing;
  e) a front trigger carried on the front hand grip for selectively starting and stopping rotation of the trimmer head when the trimmer head is in the trim mode and a rear trigger carried on the rear hand grip for selectively starting and stopping rotation of the trimmer head when the trimmer head is in the edge mode, wherein the front and rear triggers are each carried on an inner side of the front and rear hand grips, respectively; and
  f) wherein each of the front and rear hand grips have a separate trigger release that slides on an outer side of the front and rear hand grips, respectively, wherein the trigger release on its respective hand grip must be slid by the operator to a trigger release position before the trigger on the hand grip can be actuated by the operator.

2. The filament trimmer of claim 1, wherein the arch is non-symmetrical such that the front and rear hand grips do not have identical curves.

* * * * *